Sept. 24, 1963

N. L. WESTLAKE 3,105,184

VOLTAGE REGULATING RECTIFIER CIRCUIT

Filed April 4, 1955

INVENTOR.
NORMAN L. WESTLAKE

BY

ATTORNEYS

United States Patent Office 3,105,184
Patented Sept. 24, 1963

3,105,184
VOLTAGE REGULATING RECTIFIER CIRCUIT
Norman L. Westlake, Goffstown, N.H., assignor to Northeastern Engineering, Inc., Manchester, N.H., a corporation of New Hampshire
Filed Apr. 4, 1955, Ser. No. 498,994
17 Claims. (Cl. 321—18)

The present invention relates to the voltage regulation of rectified power and provides an improved D.C. power supply particularly adapted for supplying power at regulated low voltages.

The supply of D.C. power to electronic equipment is frequently provided by a rectifier of one type or another, and for optimum operating conditions the voltage must generally be maintained steady at a predetermined value. Ideally a rectifier circuit should provide a steady output voltage regardless of the load current and regardless of ordinary fluctuations in the A.C. line voltage. In addition, the circuit should not be temperature sensitive and is preferably as simple as possible.

The present invention provides a circuit substantially achieving these characteristics, particularly in providing voltage regulation against fluctuating line voltage and against temperature variations. Regulation against varying load currents may also be achieved, if desired, but is often unnecessary, since in many applications the load current will be substantially constant, as in filament power supplies for electronic equipment.

The present invention utilizes as a variable impedance in a rectifier circuit, the power winding of a saturable core reactor whose core is also wound with a control winding for controlling the level of saturation during non-conducting half cycles. In general, the circuit is designed such that the reactor is normally substantially saturated to offer a low impedance when the voltage is within its permitted limits. The current through the control winding is dependent on the output voltage, and increases with increasing output voltage to induce a flux opposing that of the power winding. This current controls the level of saturation of the core during negative half cycles and thereby controls the effective impedance of the power winding during the following positive half cycle. Thus, if the output voltage increases, the level of saturation during the negative half cycles is reduced, and during the following positive half cycle the effective impedance of the power winding is greatly increased. Similarly, if the voltage drops slightly, the reduced current results in a higher saturation of the core during the negative half cycles, and a lower impedance of the power windings during the following positive half cycle.

The core of the saturable core reactor is ideally of material having a rectangular hysteresis pattern, such as a grain oriented nickel steel, typically about 50% nickel, or other similar material. With such a core, the impedance is extremely high until saturation is reached and is then extremely low. Slight fluctuations of the current in the control winding accordingly result in wide variations in the level of saturation during negative half cycles. A high degree of control over the effective impedance of the power windings is thus provided.

Voltage regulation by means of a saturable core reactor is greatly improved in the circuit of this invention by including in the control winding circuit an element having a characteristic of sharply increasing conductivity at and above a threshold voltage. Typically and preferably this element is a silicon junction diode connected with its cathode at the positive side. When so connected, a diode of this type exhibits a non-linear resistance which is high up to a threshold voltage, or Zener potential, above which the resistance decreases almost vertically. A diode of this type has been found to be particularly suited as the voltage detecting element. A more detailed description of the silicon junction diode and its operating characteristics will be found in Pearson, G. L. and B. Sawyer, "Silicon P–N Junction Alloy Diodes," Proceedings of the I.R.E., vol. 40, pp. 1348 ff. (November 1952).

In the circuit of this invention therefore, the power winding of the saturable core reactor constitutes a variable inductance controlling the amount of current flowing during the positive half cycles of rectified current. The current in the control winding serves to vary this inductance by its control over the degree of saturation of the core during negative half cycles, and the silicon junction diode provides an extremely acute relationship between the control winding current and the output voltage such that very minute fluctuations of the output voltage are effective to provide a high degree of compensation.

This invention, as it is preferably embodied in a full wave rectifier, is described in detail below and shown in the accompanying drawing in which.

Figure 1:
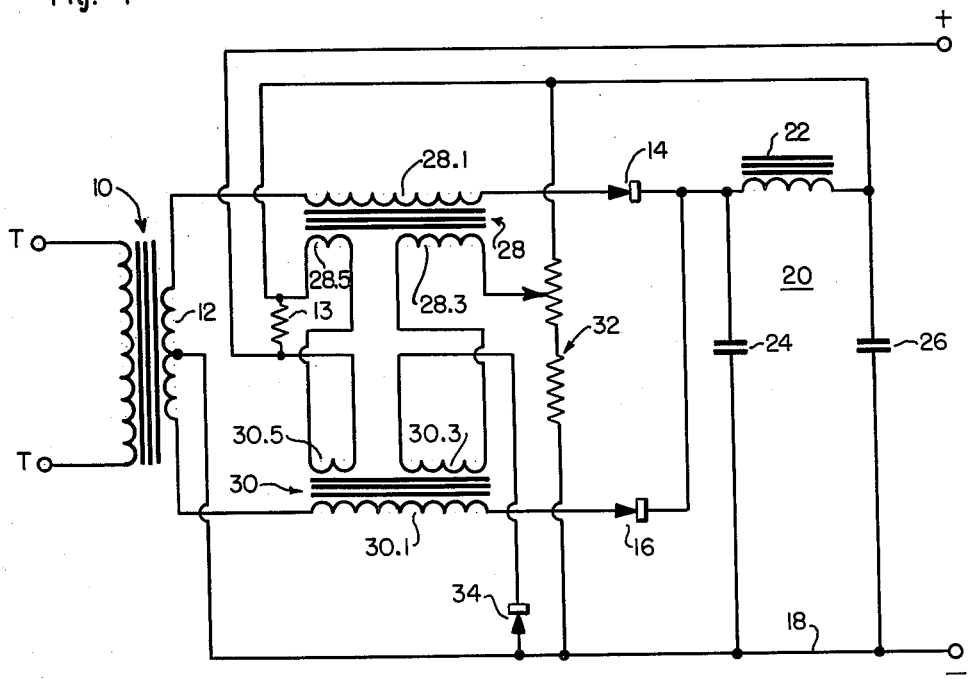
FIG. 1 is a circuit diagram of the preferred embodiment of this invention.

In the embodiment illustrated in the drawing, the voltage regulating system of this invention is incorporated in a more or less conventional full wave rectifier consisting of a transformer 10 having a center tapped secondary winding 12, the ends of which are connected together through rectifiers 14 and 16 to provide a positive side ultimately connecting with the positive output terminal +, while the center tapped connection 18 serves as the negative side connecting with the negative output terminal —. The rectified power is filtered to remove A.C. ripple by connecting the positive side through a π section 20 comprising an inductance or choke coil 22 in series in the output power circuit and a condenser 24 and 26 across the output circuit at each end of the choke coil 22. A.C. power input to the rectifier is made through the terminals T—T of the primary winding of the transformer 10.

The voltage regulating system consists essentially of a pair of saturable core reactors, 28 and 30, each having its power coil 28.1 and 30.1 in series with one end of the secondary winding 12, to serve as a variable impedance in the rectifier circuits. The power coils are each designed such that substantial saturation of the core results from the current flowing in each of them during positive pulses of rectified current under the normal conditions for which the circuit is designed. When so saturated, the power coils offer a low impedance to the secondary current.

Control windings 28.3 and 30.3 on each of the saturable cores are connected in series in a control circuit energized from a variable voltage divider circuit 32 connecting across the output circuit. The control windings are each connected to induce a flux opposing the flux of the power coils and are connected in series with a silicon junction diode 34 having its cathode positive. A resistor 35 may be provided in parallel with the diode 34 to increase the current carrying capacity of the control circuit above that of the diode alone.

Figure 2:
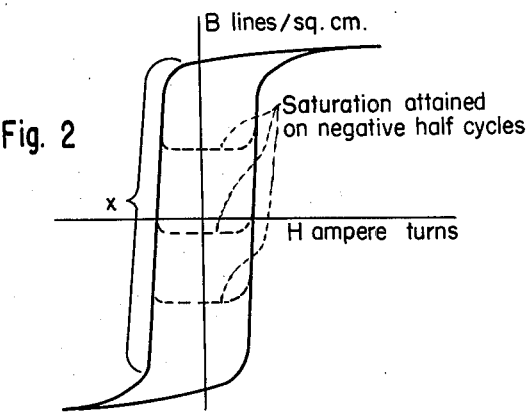
FIG. 2 is a diagram of the hysteresis pattern of typical suitable core material.

The control windings 28.3 and 30.3 thus provide means of controlling the level of saturation of the cores during negative half cycles and they thereby control the impedance of the power coils in response to output voltage fluctuations. With the voltage divider 32 adjusted so that the voltage across the silicon diode 34 is substantially at the Zener potential of the diode at the desired output voltage, slight increases in output voltage will result in disproportionately large increases in the control circuit current, the effect of which will be to reduce the core saturation and increase the impedance of the power coils. Similarly, reduced output voltage results in increased core saturation and reduced power coil impedance. These effects are shown schematically in FIGS. 2 and 3. FIG. 2 shows the hysteresis pattern of a typical saturable core. The reactors 28 and 30 are designed so that the core is saturated during positive half cycles of rectified current in the power windings 28.1 and 30.1. The control windings 28.3 and 30.3 on the other hand, are continually energized from the D.C. output voltage and during non-conducting half cycles return the core to a level of saturation dependent on the output voltage, ideally within the range designated X in FIG. 2. Thus, with upward output voltage fluctuations, the current in the control windings is increased resulting in an increased negative magnetizing force and a reduced level of saturation.

Figure 3:
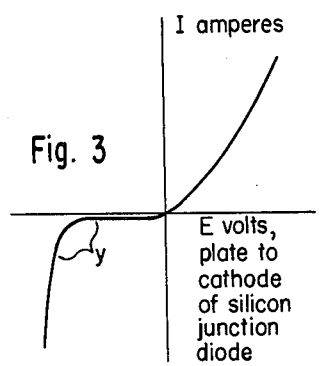
FIG. 3 is a diagram showing the voltage-current relationship of a silicon junction diode.

The extreme variation in control current with rather minor voltage fluctuations is shown in FIG. 3. The circuit is designed so that the voltage across the silicon diode will result in operation substantially at the Zener potential in the range of the curve designated Y. In this range, the current through the diode varies widely with slight voltage changes and provides a control winding current which is extremely sensitive to the output voltage.

A further control feature advantageously incorporated is a feed back winding 28.5 and 30.5 on each core of the reactors 28 and 30 in series with the rectified output, each connected to induce a flux in the same direction as the flux induced by the power windings 28.1 and 30.1

The feed back windings 28.5 and 30.5 serve to provide additional core-saturating flux which increases with increasing power output to improve voltage regulation with varying load currents. The effect of the feed-back windings is to reduce further the impedance of the power windings 28.1 and 30.1 at high load currents. The amount of feed-back winding is desirably adjusted to provide a level voltage output over the desired range of load currents. Generally less than one turn is required in which case a shunt 13 in parallel with the feed-back winding is conveniently provided.

The circuit elements are all designed in accordance with well-known principles and may be varied considerably within limitations imposed by the operating characteristics required. The rectifiers may be of any well-known type such as vacuum or gas diodes, semi-conductive solid or solid junction type, e.g. copper, copper oxide, silenium, etc.

In a typical embodiment designed to supply a 6.6 volt output the circuit components were as follows:

Transformer 10:
    Primary—110 volts.
    Secondary—22 volts with centertap.
Reactors 28 and 30:
    Core—3" O.D. x 2" I.D. x 1" wide toroid of grain oriented 50% nickel steel (Delta-Max).
    Power windings—80 turns.
    Control windings—250 turns.
    Feed back windings—<1 turn (provided by shunt 13).
Rectifiers 14 and 16—Selenium type 4" x 4" square.
Filter capacitors 24 and 26—3700 µf.
Choke coil 22—45 mh.
Resistor 32—45 Ω.
Silicon junction diode 34—Type A-4-B having a Zener potential of 5 volts (National Semi-Conductor Products Corp.).

The shunt 13 was adjusted to provide as constant an output voltage as possible under conditions of varying load current. The voltage divider circuit 32 was designed to provide the Zener potential across the diode 34 at an output voltage of 6.6 volts with the current within the capacity of the diode.

Figure 4:
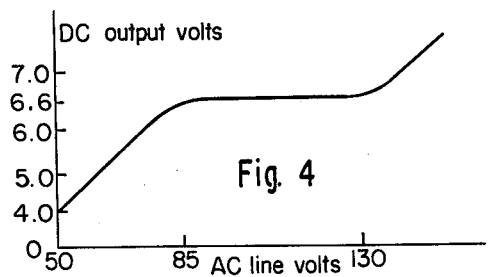
FIG. 4 shows the voltage characteristics of a typical rectifier circuit as a function of A.C. live voltage.

The voltage characteristics of the circuit are noteworthy, as shown in FIG. 4, in being substantially constant notwithstanding A.C. line voltage fluctuations of about 50%.

In addition to the high degree of voltage regulation provided, the circuit described is substantially insensitive to temperature variations, a characteristic not generally attained in circuits of this type.

Having thus disclosed this invention and described in detail a preferred embodiment thereof, I claim and desire to secure by Letters Patent:

1. A voltage regulating rectifier circuit comprising a saturable core reactor having a power winding adapted to saturate the core under normal conditions, a power circuit through said power winding including a rectifier following said winding and a D.C. circuit including filter means providing a substantially level D.C. voltage throughout each cycle following said rectifier, means for deriving an output voltage across said filter means, a control circuit including a control winding, a silicon junction diode connected in series with said control winding and having its cathode connected to the positive side of said control circuit, means for energizing said control circuit with at least a portion of said output voltage said control circuit inducing a flux opposing the flux of the power winding and reducing the level of core saturation during non-conducting half cycles.

2. A voltage regulating rectifier circuit comprising a saturable core reactor having a power winding adapted to maintain the core substantially saturated under normal conditions; a power circuit through said power winding including a rectifier following said winding, and a D.C. circuit following said rectifier and including a filter capacitor across the D.C. circuit and a filter inductance in series with the D.C. circuit; a control circuit energized by the D.C. output voltage and including a control winding on said reactor adapted to induce a flux opposing the flux of the power winding and reducing the level of core saturation during non-conducting half cycles, a silicon junction diode in series with the control winding having its cathode poled positive, and means maintaining the voltage across the diode substantially at its Zener potential when the D.C. voltage level is normal whereby D.C. voltage fluctuations are compensated by fluctuations in the control winding current; and a feed-back winding on said core in series with the D.C. output current inducing a flux opposing that of the control winding to compensate for voltage drops at increased output currents.

3. A voltage regulating rectifier circuit comprising a transformer having a center tapped secondary, a rectifier circuit in series with each end of the secondary connecting together to one side of a D.C. circuit, each rectifier circuit including a power winding on a saturable core reactor adapted to maintain the core substantially saturated under normal conditions and a rectifier following said windings; a D.C. circuit following said rectifiers and including a filter capacitor across the D.C. circuit and a filter inductance in series with the D.C. circuit; a control circuit energized by the D.C. output voltage and including a control winding on each of said reactors adapted to induce a flux opposing the flux of the power windings and reducing the level of core saturation during non-conducting half cycles, a silicon junction diode in series with the control windings having its cathode poled positive, and means maintaining the voltage across the diode substantially at its Zener potential when the D.C. voltage level is normal whereby D.C. voltage fluctuations are compensated by fluctuations in the control winding current; and a feed-back winding on each of said cores in series with the D.C. output current inducing a flux opposing that of the control windings to compensate for voltage drops at increased output currents.

4. A regulating rectifier circuit comprising an A.C. circuit including two alternatively conducting branches energizing a full wave rectifier circuit providing a substantially level D.C. output voltage throughout each cycle, a saturable core reactor having a power winding adapted to maintain the core substantially saturated under normal conditions in series with each of said branches of said A.C. circuit, a control circuit energized by the D.C. output voltage including a control winding on each of the saturable core reactors adapted to induce a flux opposing the flux of the power windings thereon to reduce the level of core saturation during non-conducting half cycles, a silicon junction diode having its cathode poled positive in series with said control windings, and means maintaining the voltage across the diode at substantially its Zener potential at normal D.C. output voltage, whereby D.C. voltage fluctuations are compensated by fluctuations in the control winding current.

5. A voltage regulator comprising a pair of saturable core reactors each carrying a power winding and a control winding, the windings carried by each core being adapted upon energization thereof to magnetize said core in mutually opposite directions, means for applying an A.C. input voltage between a first terminal of each of said power windings and a common reference point, respective ones of said first terminals being excited 180° out of phase with each other, a pair of rectifiers having corresponding output terminals thereof connected to a common junction point, each rectifier input terminal being connected to the second terminal of one of said power windings, a filter section connected intermediate said common junction point and said reference point, said filter being adapted to exclude frequency components of said A.C. input voltage to obtain a D.C. voltage between the filter output and said reference point, said control windings being connected in series, means for applying at least a portion of said D.C. voltage to one of said control windings, a diode connected intermediate the other control winding and said reference point, said diode being poled to conduct when the potential on said one control winding terminal exceeds the diode Zener level.

6. The apparatus of claim 5 and further comprising a feedback winding on each of said cores, said feedback windings upon energization thereof being respectively adapted to magnetize each of said cores in the same direction as the corresponding power windings, and means for applying at least a portion of said D.C. voltage to said feedback windings.

7. A voltage regulator comprising at least one saturable core reactor carrying a power winding and a control winding respectively, said windings upon energization thereof being adapted to magnetize said core in mutually opposite directions, means for applying an input voltage to one terminal of said power winding, a rectifier having its input connected to the other terminal of said power winding, a control circuit energizing said control winding including in series with said control winding an element characterized by an increased conductivity above a threshold voltage, and means for applying at least a portion of the output voltage of said rectifier to said control circuit.

8. Apparatus defined by claim 7 wherein a ripple filter is connected between the output of the rectifier and the control circuit.

9. The apparatus defined by claim 7 comprising also a feedback winding carried by said core, said feedback winding upon energization thereof being adapted to magnetize the core in the same direction as said power winding, and means for applying at least a portion of said D.C. voltage to said feedback winding.

10. A voltage regulator comprising a full wave magnetic amplifier having two cores saturated alternately upon successive half cycles of an alternating voltage, a series control circuit comprising two control windings and a diode connected across the amplifier output, said diode poled such that current flow will occur when the Zener breakdown voltage is exceeded across said diode.

11. A voltage regulator comprising a full wave reset magnetic amplifier, a control circuit including control windings and a silicon junction diode connected across the amplifier output, said diode poled reverse to the current flow polarity of the amplifier output voltage.

12. A voltage regulator comprising a pair of saturable cores, a control winding, a load winding on each of said cores, a load circuit including a load impedance serially connected to said load windings, an alternating voltage source, a plurality of unilateral impedance means connecting said source and said load winding, said impedance means poled to provide a magnetizing voltage across a first one of said load winding during the odd half cycles of said source and across a second one of said load windings during the even half cycles of said source, a control circuit including said control windings and a silicon junction diode serially connected to said load impedance, said diode connected such that a demagnetizing voltage will appear across said control winding when the voltage across said diode exceeds the breakdown voltage of said diode.

13. A voltage regulated rectifier comprising, a full wave reset type magnetic rectifier having two saturable cores, a load winding on each of said cores, a control winding on each of said cores, a pair of direct current output termianls, a load resistor between said terminals, an alternating supply voltage; a first load circuit including said load winding of said first core, rectifier means, said alternating voltage and said output terminals to provide a D.C. voltage output across terminals during the firing half cycle of said first core; a second load circuit including said load winding of said second core, rectifier means, said alternating voltage and said output terminals to provide a D.C. voltage output across said terminals during the firing half cycle of said second core; a control circuit including said control windings and a silicon junction diode crystal connected to said output terminals, said diode operative to breakdown and cause current flow through the control windings to desaturate the core that is on its reset half cycle.

14. A voltage regulator comprising a pair of saturable cores, a control winding and a load winding on each of said cores, a load circuit including a load resistor having a variable tap serially connected to said load windings, an alternating voltage source, a plurality of unilateral impedance means connecting said source and said load windings, said impedance means poled to provide a magnetizing voltage across a first one of said load windings during the odd half cycles of said source and across a second one of said load windings during the even half cycles of said source, a control circuit including said control windings and a silicon junction diode serially connected to the variable tap and one terminal of said load resistor, said diode connected such that a demagnetizing voltage will appear across said control windings when the voltage across said diode exceeds the breakdown voltage of said diode.

15. A voltage regulator comprising a pair of saturable cores; a control winding, a bias winding and a load winding on each of said cores; a load circuit including a load impedance serially connected to said load windings; an alternating voltage source; a plurality of unilateral impedance means connecting said source and said load windings, said impedance means poled to provide a magnetizing voltage across a first one of said load windings during the odd half cycles of said source and across a second one of said load windings during the even half cycles of said source; a control circuit including said control windings and a silicon junction diode serially connected to said load impedance, said diode connected such that a demagnetizing voltage will appear across said control windings when the voltage across said diode exceeds the breakdown voltage of said diode; a bias circuit comprising said bias windings serially connected, and a unidirectional voltage source connected to said bias windings.

16. A voltage regulator comprising a full wave magnetic amplifier having two cores saturated alternately upon successive half cycles of an alternating voltage, a bias winding and a series control circuit comprising two control windings and a diode serially connected to the amplifier output, said diode poled such that current flow will occur when the Zener breakdown voltage is exceeded across said diode, a bias circuit comprising said bias winding serially connected, and a unidirectional voltage source connected to said bias windings.

17. A voltage regulator comprising a full wave reset magnetic amplifier, a bias winding and a control circuit including control windings and a silicon junction diode serially connected to the amplifier output, said diode poled reverse to the current flow polarity of the amplifier output voltage, a bias circuit comprising said bias windings serially connected, and a unidirectional voltage source connected to said bias windings.

References Cited in the file of this patent

UNITED STATES PATENTS

| | | |
|---|---|---|
| 2,525,451 | Graves | Oct. 10, 1950 |
| 2,733,402 | Bixby | Jan. 31, 1956 |
| 2,743,152 | Carleton | Apr. 24, 1956 |
| 2,751,545 | Chase | June 19, 1956 |
| 2,816,260 | Scorgie | Dec. 10, 1957 |